United States Patent
Selders et al.

(10) Patent No.: US 9,459,169 B2
(45) Date of Patent: Oct. 4, 2016

(54) PRESSURE SENSOR AND METHOD FOR ITS MANUFACTURE

(75) Inventors: Peter Selders, Maulburg (DE);
Andreas Rossberg, Bad Sackingen (DE); Elke Schmidt, Bad Sackingen (DE); Andrea Berlinger, Baden-Baden (DE)

(73) Assignee: ENDRESS + HAUSER GMBH + CO. KG, Maulburg (DE)

( * ) Notice: Subject to any disclaimer, the term of this patent is extended or adjusted under 35 U.S.C. 154(b) by 107 days.

(21) Appl. No.: 13/993,111

(22) PCT Filed: Nov. 23, 2011

(86) PCT No.: PCT/EP2011/070824
§ 371 (c)(1),
(2), (4) Date: Jun. 11, 2013

(87) PCT Pub. No.: WO2012/079939
PCT Pub. Date: Jun. 21, 2012

(65) Prior Publication Data
US 2013/0263670 A1    Oct. 10, 2013

(30) Foreign Application Priority Data
Dec. 14, 2010  (DE) .................. 10 2010 063 065

(51) Int. Cl.
*G06K 5/04* (2006.01)
*G06K 7/10* (2006.01)
(Continued)

(52) U.S. Cl.
CPC .............. *G01L 7/00* (2013.01); *B23K 31/02* (2013.01); *G01L 9/0044* (2013.01); *G01L 9/0075* (2013.01)

(58) Field of Classification Search
CPC ....... B32K 31/02; G01L 7/00; G01L 9/0075; G01L 9/0044; G01L 7/082; C04B 37/005; C04B 2237/345; C04B 2237/708

USPC .............. 235/462.12, 375; 73/724, 723, 753, 73/700, 718, 720, 721
See application file for complete search history.

(56) References Cited

U.S. PATENT DOCUMENTS 5,005,421 A * 4/1991 Hegner et al. ................ 73/724
5,334,344 A * 8/1994 Hegner et al. ............... 420/422
(Continued)

FOREIGN PATENT DOCUMENTS

DE   3602104 A1   7/1987
DE   3602132 A1   7/1987
(Continued)

OTHER PUBLICATIONS

German Search Report, German Patent Office, Munich, Sep. 5, 2011.
(Continued)

*Primary Examiner* — Edwyn Labaze
(74) *Attorney, Agent, or Firm* — Bacon & Thomas, PLLC

(57) ABSTRACT

A method for manufacturing a pressure sensor, comprising: providing a ceramic platform, a ceramic measuring membrane, and an intermediate ring; providing an active braze material by means of gas phase deposition at least on a first surface section of a first surface and on a second surface section of a second surface. The first surface is a platform surface, which is to be connected with the intermediate ring by means of the active hard solder, or braze, or a surface of the intermediate ring, which is to be connected with the platform by means of the active hard solder, or braze. The second surface is a measuring membrane surface, which is to be connected with the intermediate ring by means of the active hard solder, or braze, or a surface of the intermediate ring, which is to be connected with the measuring membrane by means of the active hard solder, or braze. The intermediate ring is positioned between the measuring membrane and the platform; the active hard solder, or braze, is heated in a soldering, or brazing, process, wherein the intermediate ring remains essentially solid during the soldering, or brazing, process.

4 Claims, 2 Drawing Sheets

(51) Int. Cl.
*G06K 9/00* (2006.01)
*G01L 7/00* (2006.01)
*G01L 9/00* (2006.01)
*B23K 31/02* (2006.01)

(56) References Cited

U.S. PATENT DOCUMENTS

| | | | |
|---|---|---|---|
| 5,351,938 A | 10/1994 | Hegner | |
| 5,366,000 A * | 11/1994 | Reimann et al. | 164/463 |
| 5,400,489 A * | 3/1995 | Hegner et al. | 29/25.41 |
| 5,954,900 A * | 9/1999 | Hegner et al. | 156/89.11 |
| 6,050,478 A * | 4/2000 | Saint-Antonin et al. | 228/121 |
| 6,156,130 A * | 12/2000 | Hegner et al. | 148/24 |
| 6,374,680 B1 * | 4/2002 | Drewes et al. | 73/718 |
| 6,578,427 B1 * | 6/2003 | Hegner | 73/724 |
| 6,616,032 B1 * | 9/2003 | Gasse et al. | 228/248.1 |
| 7,150,197 B2 * | 12/2006 | Hegner et al. | 73/724 |
| 8,104,353 B2 * | 1/2012 | Drewes et al. | 73/718 |
| 8,176,791 B2 * | 5/2012 | Hegner et al. | 73/716 |
| 8,485,042 B2 * | 7/2013 | Hegner et al. | 73/715 |
| 8,915,142 B2 * | 12/2014 | Drewes | 73/753 |
| 2007/0052046 A1 * | 3/2007 | Chu et al. | 257/415 |
| 2007/0095144 A1 * | 5/2007 | Oboodi et al. | 73/715 |
| 2007/0190329 A1 * | 8/2007 | Wargo et al. | 428/411.1 |
| 2009/0158853 A1 * | 6/2009 | Berner et al. | 73/724 |
| 2011/0283802 A1 * | 11/2011 | Brown et al. | 73/706 |
| 2013/0213138 A1 * | 8/2013 | Rossberg et al. | 73/700 |

FOREIGN PATENT DOCUMENTS

| | | |
|---|---|---|
| DE | 102006056172 A1 | 5/2008 |
| DE | 102007026243 A1 | 12/2008 |
| EP | 0490807 B1 | 6/1992 |
| EP | 0558874 A1 | 9/1993 |
| EP | 0834487 A1 | 4/1998 |
| EP | 0988919 A1 | 3/2000 |
| EP | 1039283 A1 | 9/2000 |
| EP | 1061351 A1 | 12/2000 |
| WO | 2009019004 A1 | 2/2009 |

OTHER PUBLICATIONS

International Search Report, EPO, The Netherlands, Mar. 1, 2012.
English translation of the IPR, WIPO, Geneva, Jun. 27, 2013.

* cited by examiner

PRESSURE SENSOR AND METHOD FOR ITS MANUFACTURE

TECHNICAL FIELD

The present invention relates to a ceramic pressure sensor and a method for its manufacture.

BACKGROUND DISCUSSION

Ceramic pressure sensors comprise a platform and a measuring membrane, wherein the measuring membrane is joined with the platform by means of an active hard solder, or braze. A suitable active hard solder, or braze, for joining ceramic parts, where the ceramic is corundum, is, for example, a Zr—Ni—Ti alloy, since its coefficient of thermal expansion is compatible with that of corundum.

European Patent EP 0 490 807 B1 discloses such an active hard solder, or braze. The patent EP 0 558 874 B1 discloses a method for manufacturing rings of such an active hard solder, or braze. For connecting measuring membrane and platform, rings of such active hard solder, or braze, are placed as space holder between the two parts and melted in a high vacuum soldering, or brazing, process, whereby a pressure tight and high strength, annular connection between the two ceramic parts arises. An alternative for applying the solder in the form of prefabricated rings is to provide the active hard solder, or braze, in a screen printing method. A screen printable paste of the active hard solder, or braze, and a method for its manufacture is disclosed in Offenlegungsschrift EP 0 988 919 A1.

From the desire for miniaturization of pressure sensors, there follows indirectly the need for a thinner joint, since—, for example, in the case of a ceramic pressure sensor with a capacitive transducer—the miniaturization leads to a reduction of the electrode areas of the capacitive transducer, which then needs to be compensated by a lessening of the spacing, when the capacitance should remain unchanged.

The rings can, however, only be manufactured with reproducible thickness at a minimum thickness of, for instance, 30 µm, so that thinner joints with such active solder rings cannot be manufactured with sufficiently small tolerances.

Equally, the use of a screen printable paste leads, due to grit size of the solder, to a minimum joint thickness of 30 µm, when a sufficient homogeneity of the joint and a low tolerance of the distance between the ceramic parts should be achieved.

The as yet unpublished application DE 10 2010 043119 discloses a method for manufacture of a pressure sensor, wherein the entire material of the joint is prepared by means of gas phase deposition. Although therewith thin joints can be prepared to the extent desired, it is nevertheless a comparatively expensive method, since in the case of the gas phase deposition naturally only a fraction of the evaporated material reaches the substrate.

SUMMARY OF THE INVENTION

It is, therefore, an object of the present invention to provide a method and a correspondingly manufactured ceramic product, which overcome the disadvantages of the state of the art.

The object of the invention is achieved by the method for manufacturing a ceramic pressure sensor includes features as follows: providing a ceramic platform, a ceramic measuring membrane, and an intermediate ring; providing an active braze material by means of gas phase deposition at least on a first surface section of a first surface and on a second surface section of a second surface, wherein the first surface is a platform surface, which is to be connected with the intermediate ring by means of the active hard solder, or braze, or a surface of the intermediate ring, which is to be connected with the platform by means of the active hard solder, or braze; wherein the second surface is a measuring membrane surface, which is to be connected with the intermediate ring by means of the active hard solder, or braze, or a surface of the intermediate ring, which is to be connected with the measuring membrane by means of the active hard solder, or braze; positioning the intermediate ring between the measuring membrane and the platform; and heating the active hard solder, or braze, in a soldering, or brazing, process, wherein the intermediate ring remains essentially solid during the soldering, or brazing, process.

The soldering, or brazing, process can according to a further development of the invention be especially a vacuum soldering, or brazing, process or a soldering, or brazing, process under protective gas.

In a further development of the invention, the intermediate ring comprises a metal material, especially W, MoTiZr, MoCu, or a ceramic material, especially corundum.

In a further development of the invention, the intermediate ring has a thickness of not less than 10 µm.

In a further development of the invention, the intermediate ring has a thickness of no more than 60 µm, especially no more than 45 µm, preferably no more than 30 and especially preferably no more than 25 µm.

In a further development of the invention, the thickness of the active braze material provided by means of gas phase deposition on a surface section amounts to not less than 0.05 µm, preferably not less than 0.1 µm.

In a further development of the invention, the providing of the active braze material occurs by means of gas phase deposition in such a manner that the active braze material is provided by means of gas phase deposition on both surface sections of the platform, respectively the measuring membrane, to be joined with the intermediate ring and on at least one surface of the intermediate ring, preferably on both surfaces of the intermediate ring.

In another further development of the invention, the providing of the active braze material occurs by means of gas phase deposition in such a manner that the active braze material is provided by means of gas phase deposition on both surfaces of the intermediate ring to be joined and on at least one of the surface sections of the platform, respectively the measuring membrane, to be joined with the intermediate ring, preferably on both surface sections, that of the platform and that of the measuring membrane.

In another further development of the invention, the providing of the active hard solder, or braze, by means of gas phase deposition can occur in such a manner that at least one ceramic surface, respectively one ceramic surface section, is coated at least with an active component of the active hard solder, or braze. Then, on the layer of the active component of the active solder, or braze, a mixture of all components of the active solder, or braze, can be deposited, in order to provide a solderable, or brazable, active hard solder, or braze, and/or a mixture of the components of the active hard solder, or braze, can be provided on a surface, or a surface section, which is to be joined with the ceramic surface, or with the ceramic surface section, which is coated with the active component.

In a further development of the invention, the coating with the at least one active component has a thickness of not less than 20 nm, especially not less than 40 nm.

In a further development of the invention, the coating with the at least one active component has a thickness of no more than 200 nm, especially no more than 100 nm.

The providing of the active hard solder, or braze, by means of gas phase deposition can occur, for example, by sputtering, especially in a setup using a high power magnetron or by thermal evaporation of the active braze material. During sputtering, a target, respectively a cathode, can be used, which contains the active hard solder, or braze, in the desired composition of the components of the active hard solder, or braze, to be provided. During thermal evaporating of the active braze material from a melt of the alloy, there is the risk of segregation of the individual components in the melt, what could lead to an enrichment of a component on the surface of the melt, whereby the composition of the evaporated material no longer would correspond to the original composition of the active hard solder, or braze. Therefore, it is preferred for the thermal evaporating to provide separate sources for the individual components of the active hard solder, or braze, and to control the resulting composition of the deposited active hard solder, or braze, via the respective evaporation rates of the components.

The at least one active component comprises especially titanium or zirconium, wherein the joint comprises a Zr—Ni—Ti alloy. In a further development of the invention, the at least one coating contains Zr and Ti.

At least the measuring membrane comprises according to a further development of the invention corundum, wherein it is currently preferred that also the platform comprises corundum.

To the extent that the intermediate ring is a metal intermediate ring, according to a further development of the invention, a bonding promoter, especially titanium, can be deposited on the intermediate ring, in order to facilitate, or improve, the adhesion of the active hard solder, or braze, on the intermediate ring.

The pressure sensor of the invention comprises a ceramic platform, a ceramic measuring membrane, and an intermediate ring, which is arranged between the platform and the measuring membrane, wherein the platform is connected with the intermediate ring by means of a first joint and the intermediate ring with the measuring membrane by means of a second joint, wherein the first and second joints comprise, in each case, an active hard solder, or braze.

The active hard solder, or braze, comprises a Zr—Ni—Ti alloy in a further development of the invention.

In a further development of the invention, the intermediate ring comprises a metal material, especially W, MoTiZr, MoCu, or a ceramic material, especially corundum.

In a further development of the invention, the intermediate ring has a thickness of not less than 10 μm.

In a further development of the invention, the intermediate ring has a thickness of no more than 60 μm, especially no more than 45 μm, preferably no more than 30 and especially preferably no more than 25 μm.

The pressure sensor of the invention further comprises a transducer (not illustrated here in greater detail) for transducing a pressure dependent deformation of the measuring membrane into an electrical or optical signal. The transducer can especially be a capacitive, resistive or interferometric transducer.

The pressure sensor can comprise especially an absolute pressure sensor, a relative pressure sensor or a pressure difference sensor. In the case of a pressure difference sensor, a measuring membrane can be arranged, for example, between two platforms, or one platform bears two measuring membranes, which are coupled hydraulically with one another via a pressure transfer liquid in the platform. At least one of the connections between the one measuring membrane and the two platforms, or between the two measuring membranes and the one platform, includes according to the invention an intermediate ring, which is connected with the platform by means of a first joint and with the measuring membrane by means of a second joint, wherein preferably both connections have an intermediate ring connected in such a manner.

BRIEF DESCRIPTION OF THE DRAWINGS

The invention will now be explained based on the examples of embodiments presented in the drawing, the figures of which show as follows.

DETAILED DISCUSSION IN CONJUNCTION WITH THE DRAWINGS

Figure 1:
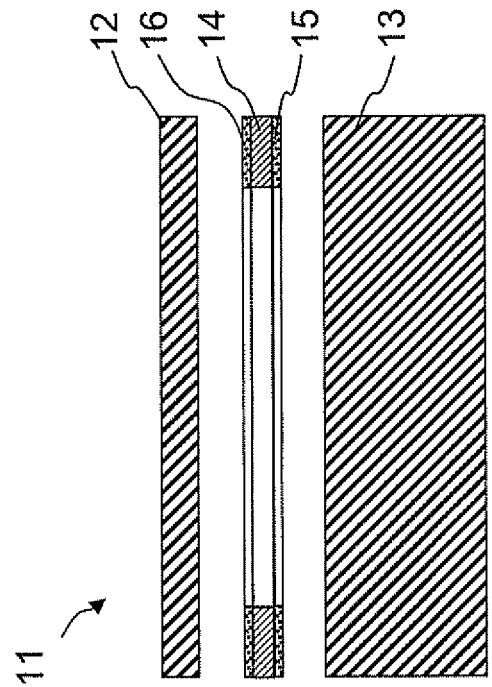
FIG. 1 is a longitudinal section through the components of a first example of an embodiment of a pressure sensor of the invention.

The components of a pressure sensor 1 illustrated in FIG. 1 comprise a circular, disk shaped, measuring membrane 2 and a circular, disk shaped, platform 3, wherein both the measuring membrane as well as also the platform comprise corundum. The measuring membrane and the platform have, for example, a diameter of not less than 1 cm and no more than 7 cm. The measuring membrane has, for example, a thickness of not less than 50 μm and no more than 3 mm. The actually selected thickness of the measuring membrane is—in the case of given strength of the membrane material—especially a function of the pressure measuring range, expected overloads and the diameter of the measuring membrane. The platform has a thickness of several mm, in order to be as stiff as possible relative to the forces acting on it. Arranged between the measuring membrane 2 and the platform 3 is an intermediate ring 4, which has, for example, a material thickness of, for instance, 25 μm and comprises, for example, an alloy of molybdenum and copper.

The outer diameter of the intermediate ring essentially equals the outer diameters of the platform and the measuring membrane, wherein the inner diameter amounts to, for example, 2 to 8 mm less, in order to provide a sufficiently large bearing surface for an edge region of the measuring membrane, wherein, in measurement operation, there usually lies on the edge region of the measuring membrane a sealing ring, which is clamped between the pressure sensor and a sealing surface around a housing opening.

For connecting the measuring membrane with the intermediate ring and the platform with the intermediate ring, there are provided by means of gas phase deposition on the measuring membrane 2 and the platform 3, in each case, aligned with the intermediate ring, layers of an active hard solder, or braze, 5, 6, wherein the layers have, for example, a thickness of, for instance, 5 µm. The active hard solder, or braze, can be especially a Zr—Ni—Ti-active hard solder, or braze.

During depositing of the active hard solder, or braze, on the surfaces of the measuring membrane 2 and the platform 3, the surface sections not to be coated are covered with masks.

The described components in the illustrated arrangement are laid against one another and then joined together in a high vacuum soldering, or brazing, process. This leads to forming between measuring membrane and platform a reference pressure chamber, whose height is defined by the thickness of the intermediate ring and the respective thicknesses of the active hard solder, or braze, layers.

Figure 2:
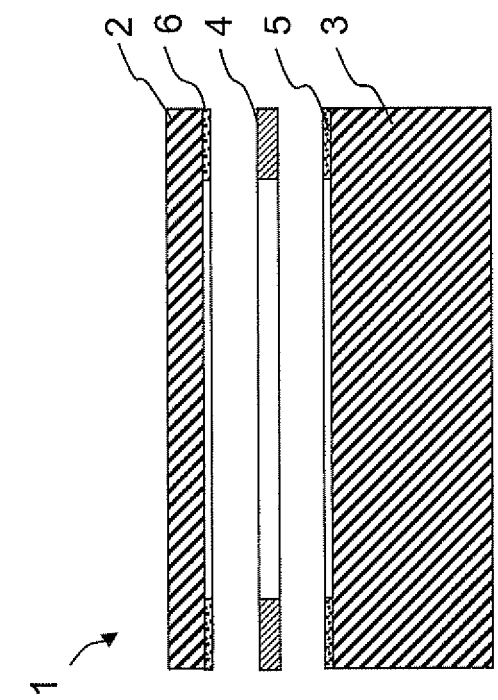
FIG. 2 is a longitudinal section through the components of a second example of an embodiment of a pressure sensor of the invention.

The second example of an embodiment of a pressure sensor 11 of the invention shown in FIG. 2 includes a measuring membrane 12, a platform 13, and an intermediate ring 14, wherein for the materials and dimensions of the measuring membrane, the platform and the intermediate ring, the explanations for the first example of an embodiment correspondingly hold in this case too. In the here considered example of an embodiment, however, the intermediate ring 14 is coated with a first layer of the active hard solder, or braze, 15 and with a second layer of the active hard solder, or braze, 16, so that a depositing of the active hard solder, or braze, on the measuring membrane, respectively the platform, can be omitted. For connecting these components 12, 13, 14, they are brought into contact with one another in the illustrated sequence and joined together in a high vacuum soldering, or brazing, process. An advantage of this example of an embodiment is that the masking of the measuring membrane and the platform for depositing the active hard solder, or braze, can be omitted. Masking is not required for the intermediate ring 14.

Figure 3:
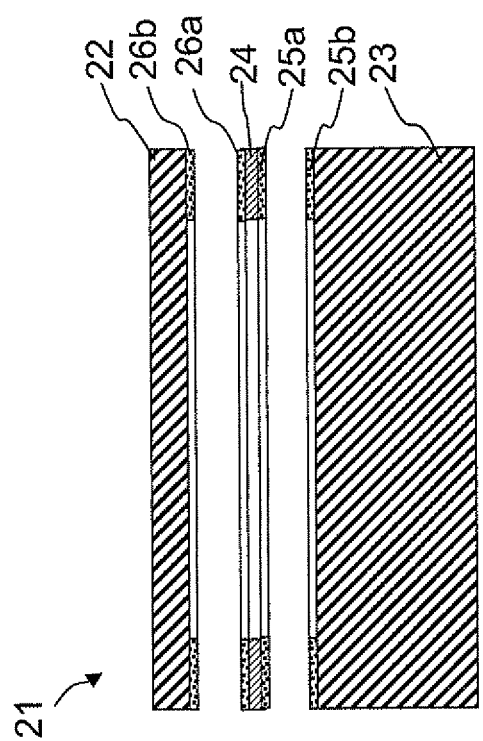
FIG. 3 is a longitudinal section through the components of a third example of an embodiment of a pressure sensor of the invention.

The third example of an embodiment of a pressure sensor 21 of the invention shown in FIG. 3 includes, again, a measuring membrane 22 and a platform 23 as well as an intermediate ring 24, wherein here all to be joined surface sections are coated by means of gas phase deposition with an active hard solder, or braze. Thus, for the connection between the platform 23 and the intermediate ring 24, a layer of the active hard solder, or braze, 25a is deposited on a first surface of the intermediate ring facing the platform and an annular layer of the active hard solder, or braze, 25b is deposited on the platform. Correspondingly, a layer of the active hard solder, or braze, 26a is deposited on a second surface of the intermediate ring 24 facing the measuring membrane and an annular layer of the active hard solder, or braze, 26b is deposited on the measuring membrane. This procedure can be advantageous, for example, in order to assure a uniform wetting of the surfaces with the active hard solder, or braze. This is especially advantageous when also the intermediate ring 24 comprises a ceramic material, especially corundum, same as the measuring membrane 22 and the platform 23.

Figure 4:
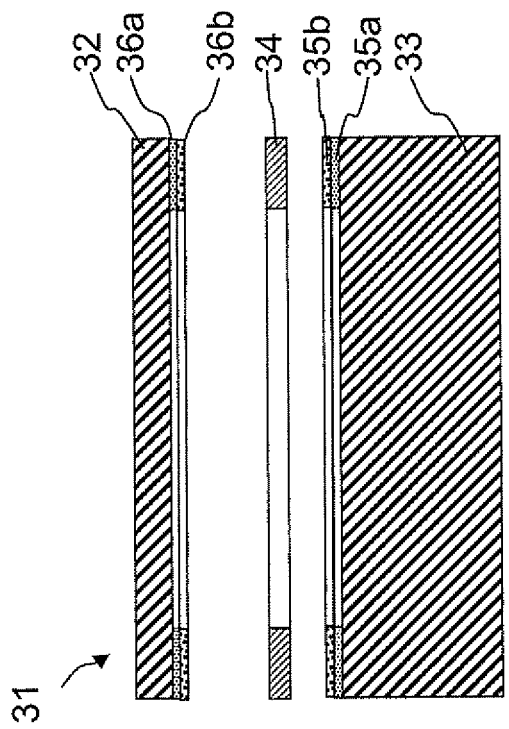
FIG. 4 is a longitudinal section through the components of a fourth example of an embodiment of a pressure sensor of the invention.

The fourth example of an embodiment of sa pressure sensor 31 of the invention shown in FIG. 4 corresponds in large part to the first example of an embodiment, wherein, in this case, the measuring membrane 32 and the platform 33 are coated with the active hard solder, or braze, in such a manner that, first of all, on the end face of the platform and on the measuring membrane surface facing the platform, respectively the intermediate ring 34, annular regions are coated with an active component 35a, 36a of the active hard solder, or braze, before, for completing the active hard solder, or braze, all components of the active hard solder, or braze, are deposited in a second layer 35b, 36b on the initially deposited, active component. The thickness of the layers of the active component 35a, 35b can be, for example, in each case, for instance, 100 nm, while the second layer of the active hard solder, or braze, 35b, 36b amounts, in each case, to, for instance, 1 µm.

All examples of embodiments of the pressure sensor of the invention comprise furthermore a transducer for transducing a pressure dependent deformation of the measuring membrane, wherein the transducer can be a capacitive, a (piezo-) resistive or an optical transducer. Details for this are known to those skilled in the art and do not require further explanation.

Equally, the pressure sensor can be an absolute pressure sensor or a relative sensor, wherein, in the case of an absolute pressure sensor, the reference pressure chamber formed between the measuring membrane and the platform is evacuated, while, in the case of a relative pressure sensor, it is contactable with the ambient pressure via a duct through the platform. Furthermore, the pressure sensor of the invention can be a pressure difference sensor, for which, for example, a platform is to be joined between two measuring membranes, in which case there are two intermediate rings, one on each side of the platform, or for which one measuring membrane is arranged between two platforms, in which case there are two intermediate rings, one on each side of the measuring membrane. The basic construction of these types of pressure difference sensors with a platform between two measuring membranes or a measuring membrane between two platforms are known to those skilled in the art and do not need further explanation here.

The invention claimed is:

1. A pressure sensor, comprising:
a ceramic platform;
a ceramic measuring membrane; and
an intermediate ring, which is arranged between said platform and said measuring membrane, wherein:
said platform is connected with said intermediate ting by means of a first joint;
said intermediate ring is connected with said measuring membrane by means of a second joint;
said first and second joints comprise, in each case, an active hard solder, or braze;
said intermediate ring comprises a metal material, especially W, MoTiZr, MoCu, said metal material essentially remaining solid at the melting temperature of said active hard solder, or a ceramic material, especially corundum; and
said intermediate ring has a thickness of no more than 45 µm.

2. The pressure sensor as claimed in claim 1, wherein: said measuring membrane and/or said platform comprise corundum; and said active hard solder comprises a Zr—Ni—Ti alloy.

3. The pressure sensor as claimed in claim 1, wherein: said intermediate ring has a thickness of no more than 30 µm.

4. The pressure sensor as claimed in claim 1, wherein: said intermediate ring has a thickness of no more than 20 µm.

* * * * *